Figure 1:
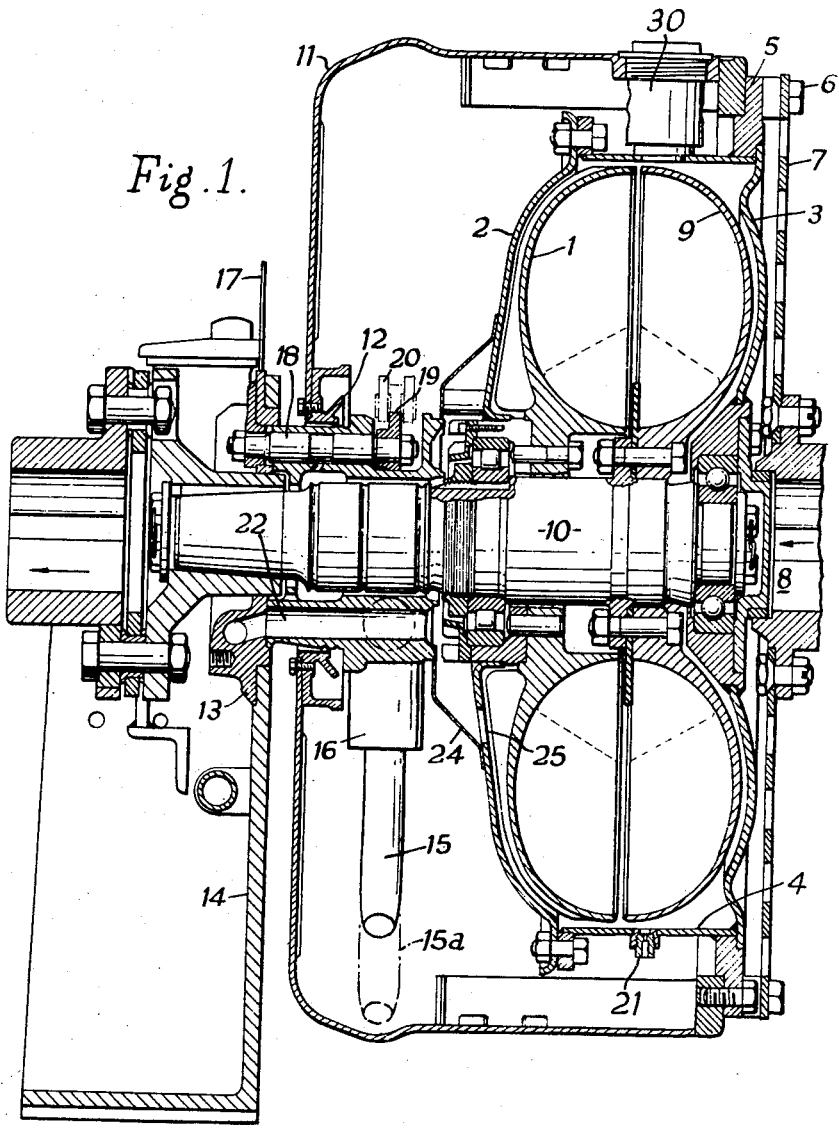

April 17, 1962 A. C. BASEBE 3,029,604
HYDRAULIC TURBO COUPLINGS
Filed Sept. 6, 1960 3 Sheets-Sheet 1

INVENTOR
ARTHUR CECIL BASEBE

BY
Benjamin Sweedler
ATTORNEY

April 17, 1962  A. C. BASEBE  3,029,604
HYDRAULIC TURBO COUPLINGS
Filed Sept. 6, 1960  3 Sheets-Sheet 2

INVENTOR
ARTHUR CECIL BASEBE

BY
Benjamin Sweedler
ATTORNEY

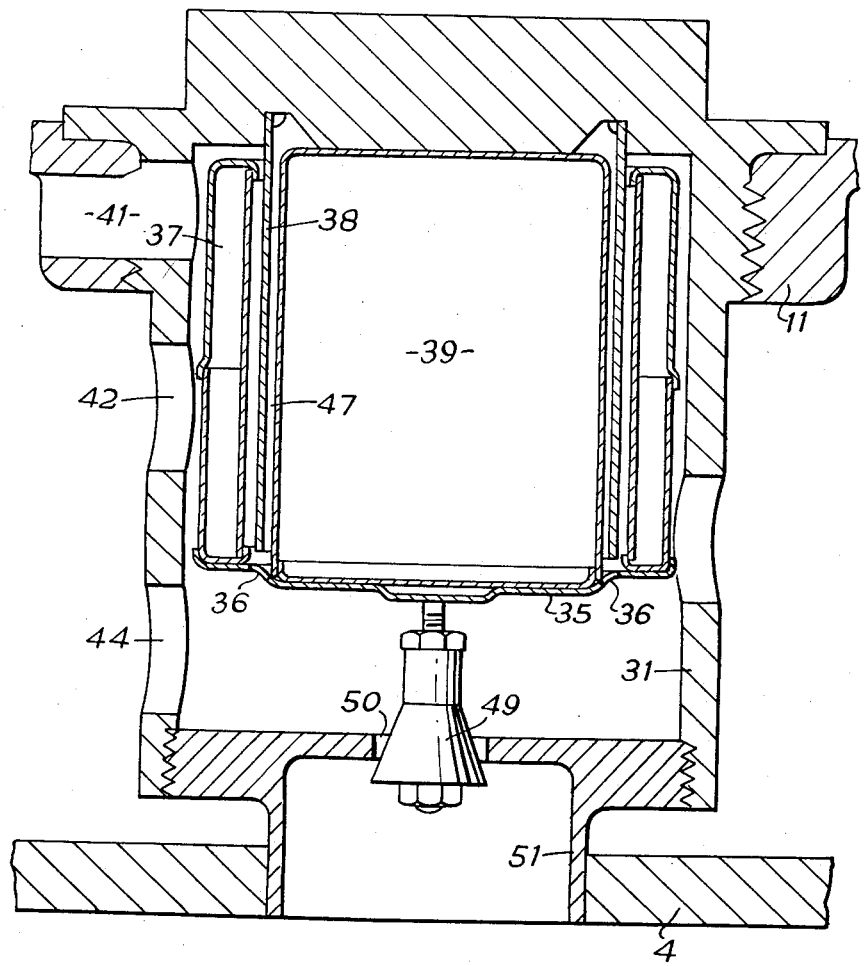

United States Patent Office 3,029,604
Patented Apr. 17, 1962

3,029,604
HYDRAULIC TURBO COUPLINGS
Arthur Cecil Basebe, Twickenham, England, assignor to Harold Sinclair, London, England
Filed Sept. 6, 1960, Ser. No. 54,098
Claims priority, application Great Britain Sept. 7, 1959
1 Claim. (Cl. 60—54)

This invention relates to hydraulic turbo couplings, and is an improvement in or modification of the hydraulic turbo coupling claimed in patent application Ser. No. 633,583, issued as Patent No. 2,957,312, October 25, 1960.

Patent application Ser. No. 633,583 claims a hydraulic turbo coupling comprising vaned impeller and runner elements, means for varying the degree of filling of the working circuit of the coupling whereby to vary the torque-transmitting capability of the coupling, and means whereby during the operation of the coupling working liquid flows at a restricted rate from the working circuit, the coupling being provided with at least one valve that operates in response to changes in the filling of the working circuit to increase the effective flow area available for the restricted flow of liquid from the working circuit as the degree of filling decreases and vice versa.

In the embodiment of the invention described in the patent application Ser. No. 633,583 the said valve that operates in response to changes in the filling of the working circuit is actuated by a bellows which is subjected to the pressure of working liquid in a reservoir chamber rotatable with the impeller of the coupling, the said pressure tending to compress the bellows against the action of a spring and actuate the valve to increase the flow area through said valve and hence increase the restricted flow of working liquid from the working circuit to the reservoir chamber, when the degree of filling of the working circuit decreases, and vice versa.

In accordance with the present invention there is provided a hydraulic turbo coupling comprising vaned impeller and runner elements forming a working circuit, a rotary reservoir chamber and means for varying the degree of filling of the working circuit whereby to vary the torque-transmitting capability of the coupling, and having means whereby during the operation of the coupling working liquid flows at a restricted rate from the working circuit to said reservoir chamber and forms a rotating ring of liquid therein, the coupling being provided with at least one valve for controlling said restricted flow, and valve operating means responsive to changes in the filling of the working circuit to operate said valve to increase the effective flow area available for the restricted flow of liquid from the working circuit as the degree of filling of the working circuit decreases and vice versa, said valve-operating means comprising a first float coupled to said valve and movable to actuate the valve in accordance with the varying radial depth of the said ring of liquid formed in the reservoir chamber, and a second float also coupled to said valve and movable in a float chamber in which while the coupling is in operation liquid is maintained at a substantially constant depth.

Figure 2:
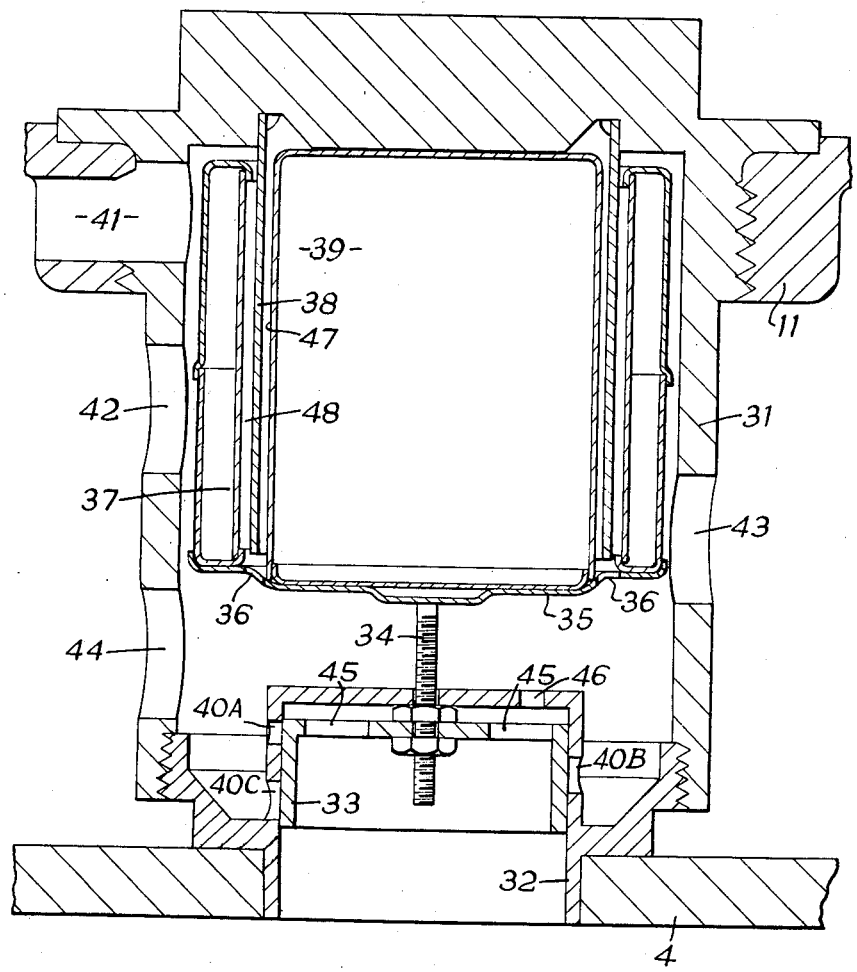

In the accompanying drawings, FIG. 1 shows a hydraulic turbo coupling according to the invention in sectional elevation, FIG. 2 is a sectional view, on a larger scale than FIG. 1, of one form of valve incorporated in the coupling, and FIG. 3 is a sectional view on the same scale as FIG. 2, showing a different form of valve.

Referring to FIGS. 1 and 2, the hydraulic turbo coupling illustrated comprises a vaned impeller 1 bolted to an inner casing comprising end parts 2 and 3 and a cylindrical part 4, the wall 3 being connected via a ring 5 and bolts 6 to the periphery of a driving plate 7 the inner periphery of which is bolted to a flange on an input shaft 8. A vaned runner 9 is bolted to a flange on an output shaft 10 which is journalled within the hubs of the walls 2 and 3 of the inner casing. A reservoir casing 11 is fixed at its edge to the ring 5, so as to be rotatable with the driving plate 7 and impeller 1, a labyrinth oil seal 12 being provided between the inner periphery of the reservoir casing 11 and a stationary scoop tube manifold 13 supported by a bracket 14. A scoop tube 15 movable longitudinally in a guide 16 of the manifold 13 is operable by means of a lever 17 carried by a pin 18 that projects through the manifold 13 and is operatively connected to the scoop tube 15, in conventional manner, by levers 19 and 20.

The inner casing 2, 3, 4 is provided with say three restricted nozzles 21 (one of which is shown in FIG. 1) uniformly spaced around the inner casing, so that during the operation of the coupling working liquid flows from the working circuit within the inner casing, through the nozzles 21 to the reservoir casing 11 where it forms a rotating ring of liquid adjacent the cylindrical outer wall of the reservoir casing. The scoop tube 15 picks up liquid from the said ring and transfers it via a duct (not shown) in the manifold 13 to a cooler (not shown) whence it returns via a further duct 22 to the interior of a casing 24 and thence via ports 25 to the working circuit of the coupling.

The turbo coupling as so far described is of known construction. During its normal operation there is a continuous flow of working liquid out of the working circuit via the restricted nozzles 21 and a continuous flow back to the working circuit via the ports 25. Adjustment of the scoop tube 15 by means of the lever 17 changes the distance of the scooping lip of the scoop tube from the periphery of the reservoir casing 11 and so changes the thickness of the ring of oil in the reservoir casing, thereby changing the degree of filling of the working circuit.

The centrifugal pressure of the liquid within the inner casing 2, 3, 4 varies with the degree of filling of the working circuit. This pressure is greatest when the filling of the working circuit is a maximum and decreases as the degree of filling of the working circuit decreases, so that correspondingly the rate of flow of liquid through the restricted nozzles 21 then decreases.

In order to remedy this basic shortcoming of turbo couplings having such restricted nozzles, in the embodiment of the invention shown in FIGS. 1 and 2, the coupling is provided instead of or additionally to the leak-off nozzles 21, with one or more valves one of which is shown in elevation at 30 at the upper part of FIG. 1, and in section on a larger scale in FIG. 2, which illustrates the valve in the operating condition at normal speed of rotation with the working chamber filled and the reservoir chamber 11 almost empty.

Referring to FIG. 2, valve 30 includes a cylindrical valve housing 31 screwed into the wall of the reservoir casing 11, with its axis radial with respect to the coupling axis, the radially inner end of the valve housing 31 carrying a cup-shaped piston guide 32 which is coaxial with the valve housing 31 and the open radially inner end of which fits in an opening in the cylindrical inner casing 4. A piston 33 which is cup-shaped and is open towards the coupling axis and which is movable axially in the piston guide 32 has a piston rod 34 which projects through the end wall of the piston guide 32 and has its radially outer end connected to a disc 35 formed with a circular array of liquid transfer holes 36 and carrying at its periphery an annular closed chamber 37 movable in the valve housing 31 radially with respect to the coupling axis and constituting the abovementioned first float. A cylindrical wall 38 fixed at one end to the radially outer end wall of the valve housing 31 and forming the liquidcontaining chamber 47 abovementioned projects between the first float 37 and a second float 39 of cylindrical form carried by the disc 35, being coaxial with the valve housing 31 and the cylindrical wall 38, the radially inner end of chamber 47 being open.

The cylindrical wall of the piston guide 32 is formed with ports 40A, 40B and 40C at different distances from the coupling axis. When the piston 33 is in its radially outermost position as shown it covers all of the said ports, but when one or more of the ports is or are uncovered the interior of the piston guide 32 communicates with the interior of the valve housing 31, which is formed with large holes 41, 42, 43 and 44 at different distances from the coupling axis, through which the interior of the valve housing 31 is in full permanent communication with the reservoir chamber 11. The end wall of the piston 33 has ports 45, and a small port 46 in the end wall of the piston guide 32 constitutes a leak-off nozzle which like the leak-off nozzle 21 permits restricted flow of working liquid from the working circuit of the coupling to the reservoir chamber 11.

With the coupling in operation, when the scoop tube 15 is fully inserted into the reservoir chamber 11 as shown in broken lines in FIG. 1 at 15a, and the working circuit is consequently full, the first and second floats 37 and 39 being connected together to form a unit are in their radially outermost positions as shown in FIG. 2, and the piston 33 is likewise in its radially outermost position in which it covers the ports 40A, 40B and 40C. Liquid from the working circuit flows continuously at a restricted rate through the piston guide 32 and the leak-off nozzles including the port 46, and thence through the large hole 41, in the housing 31 to the reservoir chamber 11. Initially, some of the liquid issuing from the port 46 flows through the liquid transfer holes 36 in the disc 35 and into the cylindrical float chamber 47 within the cylindrical wall 38, and fills this float chamber completely, i.e. to the level of the open end of the cylindrical wall 38. The annular float chamber 48 formed between the cylindrical wall 38 and the valve housing 31 becomes filled up partially, viz. to the same depth as that of the ring of liquid in the reservoir chamber, by reason of the large holes 41, 42, 43, 44 in the valve housing 31.

When the scoop tube 15 is retracted (e.g. to the position shown in full lines in FIG. 1) to allow the depth of the ring of liquid in the reservoir chamber 11 to increase so as to decrease the degree of filling of the working circuit, the depth of liquid in the annular float chamber 48 increases and the annular first float 37 being buoyant in the liquid moves radially inwardly towards the coupling axis, together with the second float 39, to which it is connected, causing the piston 33 to move radially inwardly. A sufficient inward movement of the piston 33 causes it to uncover partially the port 40A, so that liquid can now flow from the working circuit to the reservoir chamber 11 not only via the aforesaid leak-off nozzles but also via the partially uncovered port 40A, so that the flow from the working circuit is increased (although still restricted) as is required in order to increase the circulation of liquid through the cooler and working circuit.

Since the cylindrical second float 39 moves radially inwardly with the annular first float 37, the depth of the liquid in the cylindrical float chamber 47 may be momentarily reduced, but is at once restored and maintained at the original full depth by the flow of liquid from the valve housing 31 to the cylindrical float chamber 47 through the transfer ports 36.

Further and continued retraction of the scoop tube 15 causes the piston 33 to uncover a larger area of the partially uncovered port 40A, then to uncover it entirely, and then successively to uncover the ports 40B and 40C, so as continuously to increase the area available for the restricted flow of liquid from the working circuit to the reservoir chamber.

Upon insertion of the scoop tube 15 viz. movement of its scooping orifice towards the periphery of the reservoir chamber 11, the annular first float 37 moves radially outwardly due to the decreased depth of the liquid in its float chamber 48, and the cylindrical second float 39 moves with it, thereby expelling liquid from its full float chamber 47, the expelled liquid spilling over the edge of the open-ended cylindrical wall 38 and passing to the reservoir chamber 11 via the annular float chamber 48 and the large holes 41 to 44 in the valve housing 31. At the same time the piston 33 moves radially outwardly, successively closing the port 40C, 40B and 40A and thereby decreasing the area available for the restricted flow of liquid from the working circuit, and hence decreasing the circulation rate through the cooler.

Referring now to FIG. 3, the piston 33 and ports 40A, 40B and 40C of FIG. 2 are here replaced by a valve comprising a conical valve member 49 which projects through a hole 50 in an annular member 51 forming the radially inner end of the valve housing 31. The hole 50 may be arranged to be partly open when the first and second floats 37 and 39 are in their radially outermost positions as shown so that at all times when the coupling is in operation there is restricted flow of liquid from the working circuit to the interior of the cylindrical valve housing 31 via the hole 50. Alternatively, the hole 50 may be arranged to be closed when the floats are in their radially outermost positions, in which case one or more separate continuously open leak-off nozzles 21 (FIG. 1) will necessarily be provided.

In an arragement according to the invention the valve does not require a spring that needs to be adjusted according to the proposed impeller speed. There is moreover a substantially linear relation between the scoop tube setting and the rate of restricted flow of liquid from the working circuit, over a wide range of scoop tube settings, the rate of flow through the working circuit and the cooler increasing as the scoop tube is withdrawn, viz. as its scooping orifice is moved radially inwardly away from the periphery of the reservoir chamber.

I claim:

A hydraulic turbo coupling comprising vaned impeller and runner elements together defining a toroidal working circuit, a rotary reservoir chamber, said working circuit and reservoir chamber when in operation having together a predetermined total quantity of working liquid therein and having means whereby during the operation of the coupling working liquid flows at a restricted rate from the working circuit to the reservoir chamber and forms a rotating ring of working liquid therein, means for varying the radial depth of the ring of working liquid in the reservoir chamber by returning working liquid therefrom to the working circuit so as to vary the degree of filling of the working circuit and thereby the torque transmitting capability of the coupling, at least one valve for controlling said restricted flow, and valve operating means responsive to changes in the filling of the working circuit to operate said valve to increase the effective flow area available for the restricted flow of working liquid from the working circuit as the degree of filling of the working circuit decreases, and vice versa, said valve-operating means comprising a first float coupled to said valve and movable relative to the coupling axis to actuate the valve in accordance with the varying radial depth of the said ring of liquid formed in the reservoir chamber, and a second float also coupled to said valve and movable in a float chamber in which while the coupling is in operation liquid is maintained at a substantially constant depth.

References Cited in the file of this patent

UNITED STATES PATENTS 2,536,473    Sinclair    Jan. 2, 1951
2,957,312    Sinclair    Oct. 25, 1960